March 3, 1964 E. J. CRANE ET AL 3,122,778
DRIVE FOR POULTRY PICKING MACHINE
Filed Feb. 13, 1961 4 Sheets-Sheet 1

INVENTORS:
Edward J. Crane
and Allen Masters,
BY
Bair, Freeman & Molinare
ATTORNEYS.

March 3, 1964 — E. J. CRANE ET AL — 3,122,778
DRIVE FOR POULTRY PICKING MACHINE
Filed Feb. 13, 1961 — 4 Sheets-Sheet 3
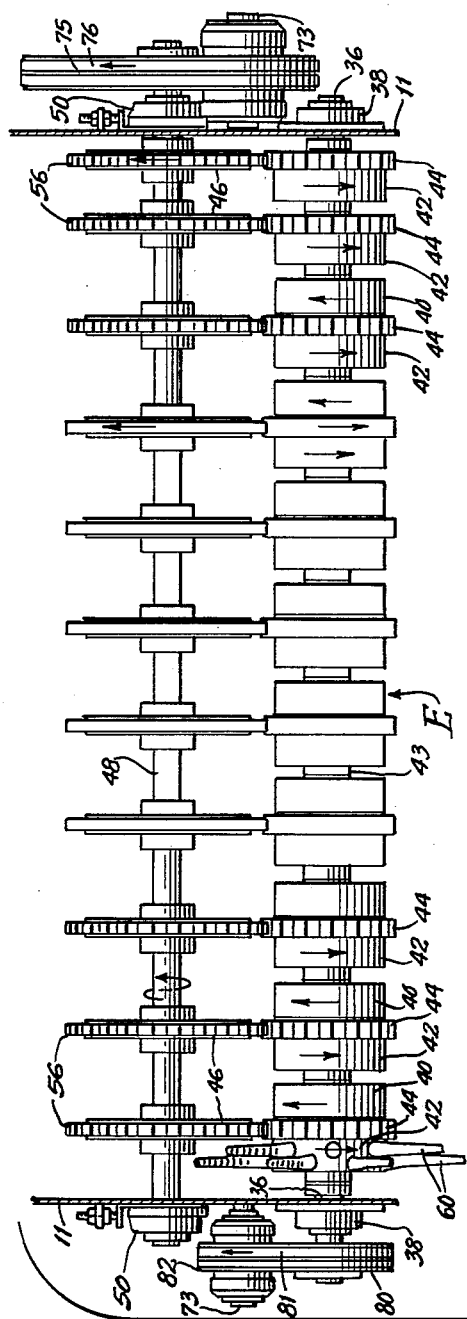
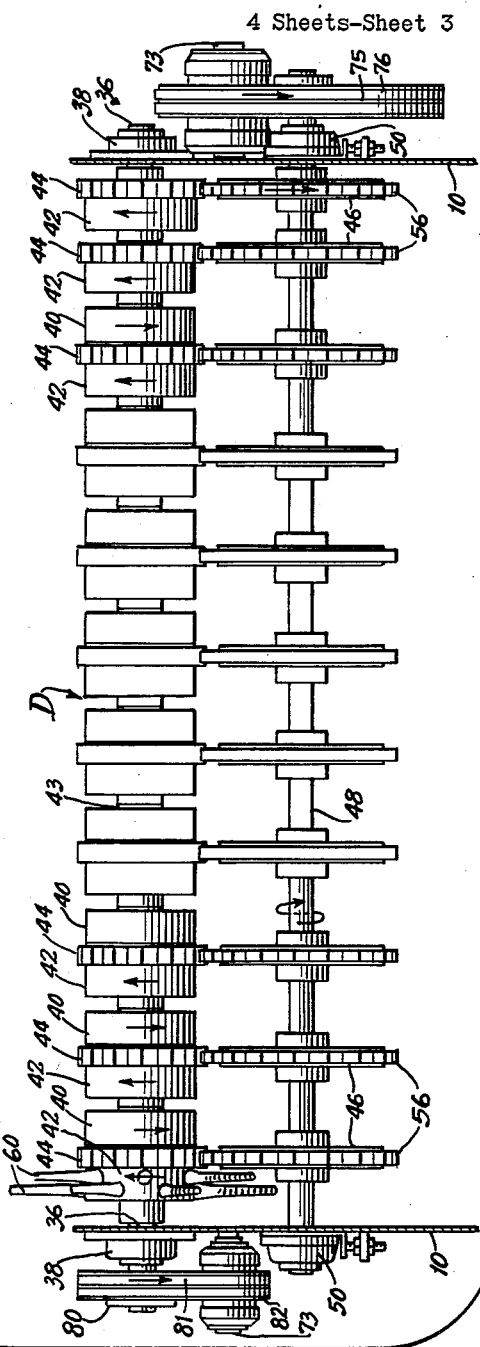
Fig. 3
INVENTORS:
Edward J. Crane
and Allen Masters,
BY Bair, Freemont & Molinare
ATTORNEYS.

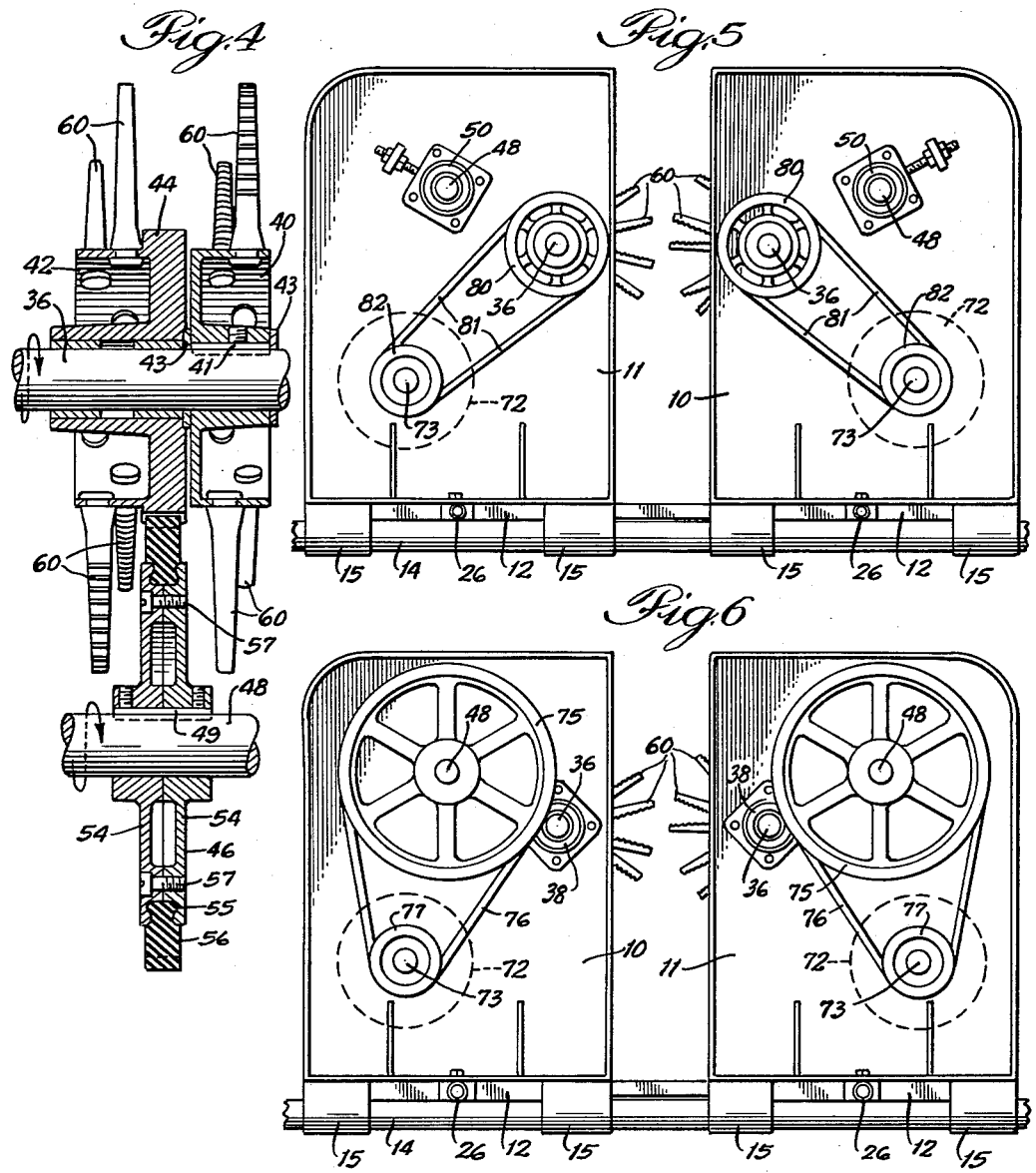

United States Patent Office 3,122,778
Patented Mar. 3, 1964

3,122,778
DRIVE FOR POULTRY PICKING MACHINE
Edward J. Crane, Ottumwa, and Allen L. Masters, Agency, Iowa, assignors, by mesne assignments, to Equity Financial Corporation, a corporation of Delaware
Filed Feb. 13, 1961, Ser. No. 88,692
3 Claims. (Cl. 17—11.1)

This invention pertains to automatic fowl picking machines of the type wherein picking forces are applied in a plurality of directions on the various portions of the bodies of the fowls.

Machines of this type have heretofore been devised in various forms, and the present invention pertains to machines of the general type wherein fowls suspended by their legs on an overhead conveyor are caused to be moved between a pair of spaced apart, rotatable drum assemblies, each having a plurality of radially extending flexible feather picking fingers.

More specifically, the present invention is directed to machines of this general type wherein each drum assembly is made up of a plurality of separate drum sets or units, each provided with a plurality of radially extending picking fingers, and wherein certain drum sets or units are caused to be rotated in a direction opposite to the direction of rotation of certain other drum sets or units. Such machines have heretofore been constructed and arranged so that the drum assemblies may be adjusted, with their axes inclined to horizontal, so as to insure applying a picking action over the entire bodies of the fowls while passing through the machine. Such machines also have been constructed so as to permit vertical adjustment of the drum assemblies, as well as adjustment toward and away from each other, in order to provide an efficient picking action on fowls of various kinds and sizes. In the use of machines of this type it is unnecessary to remove the fowls from the conveyor and suspend them from their necks, and to convey the fowls for passage through other special types of picking machines to insure substantially complete removal of all feathers from the bodies of the fowls.

Picking machines having drum assemblies, each comprising sets or units that are rotatable in opposite directions, as heretofore produced, utilize a multiplicity of separate V-belt drive mechanisms for certain of the drum sets or units, and which drives possess numerous disadvantages which impair the efficiency of the picking action, as well as disadvantages in service and maintenance of the machines.

One of the objects of this invention is to provide a novel, improved and economical drive for certain picking drum sets of a drum assembly of a picking machine of the character indicated.

Another object is to provide an improved form of drive for certain picking drum sets of a drum assembly of a machine of the character indicated, which results in:

(a) improved sanitary conditions,
(b) quick and easy repair and maintenance,
(c) accommodating wads of feathers or picking fingers passing through the drive without causing damage or injury thereto,
(d) providing adequate tolerance and accommodation in center to center adjustment between cooperating drive members without affecting the efficiency of the drive, and
(e) a long and efficient life for the drive.

A further object is to provide an improved picking machine of the character indicated which is constructed and arranged so that the cooperating flexible fingers of the first drum sets apply a downward stroke to the fowls as they first enter the machine and thereby insure against the fowls, and particularly small fowls, being pulled or pushed into the drive mechanisms for the drum sets or units.

Other objects and advantages of this invention will be apparent from the following description, taken in connection with the accompanying drawings, in which:

FIGURE 3 is a schematic view of the drum assemblies and the drives therefor of the machine of the present invention.

FIGURE 4 is an enlarged sectional view of a pair of adjacent drum sets of one of the drum assemblies, and the associated drives for one of the sets.

FIGURE 5 is an end view of the machine with the end closure panels removed.

FIGURE 6 is a view of the opposite end of the machine with the end closure panels removed.

FIGURE 7 is an enlarged sectional view through one of the types of adjusting mechanisms of the machine, and taken substantially as indicated at line 7—7 on FIGURE 1.

Figure 1:
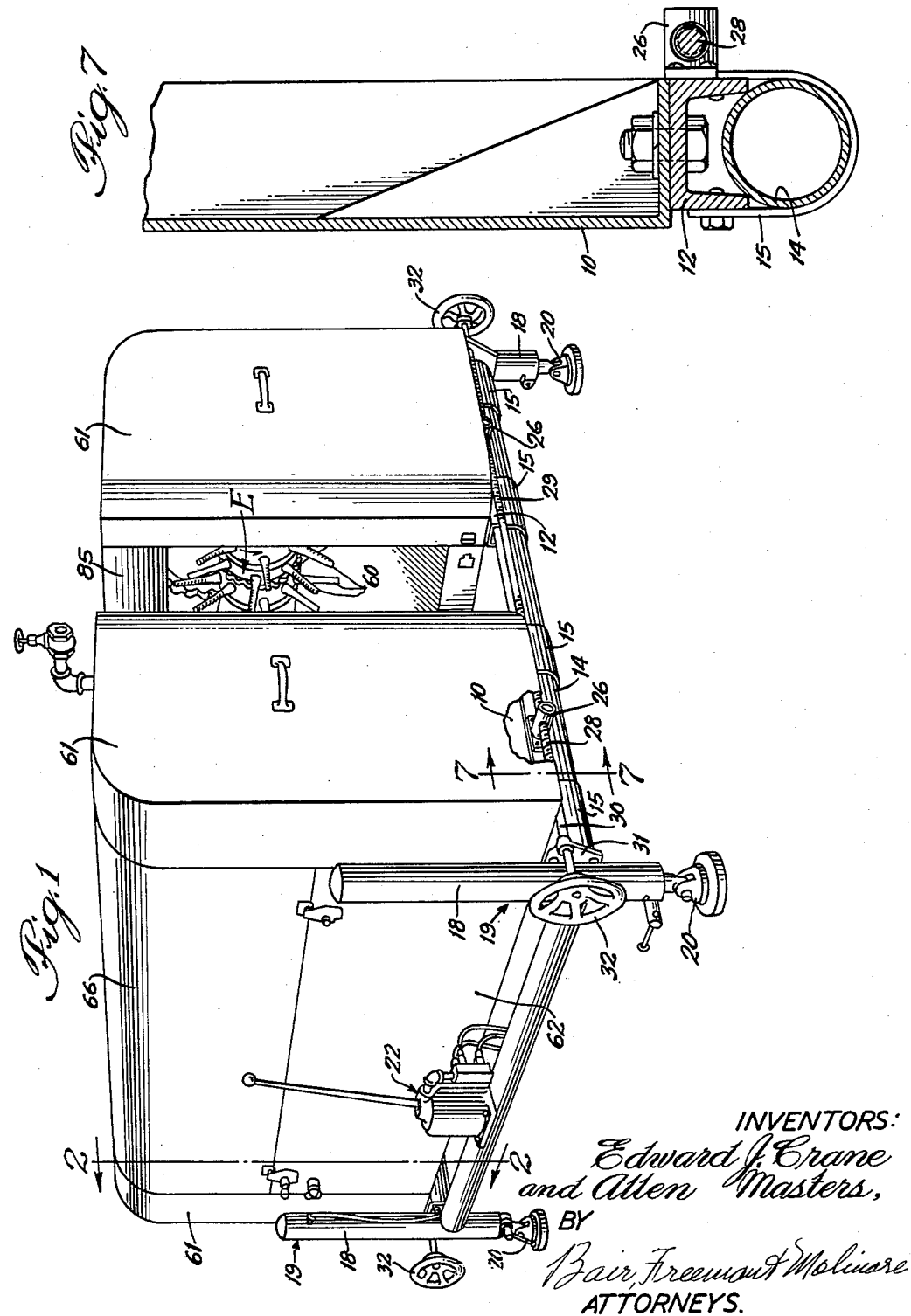
FIGURE 1 is a perspective view of a picking machine embodying the present invention.
Figure 2:
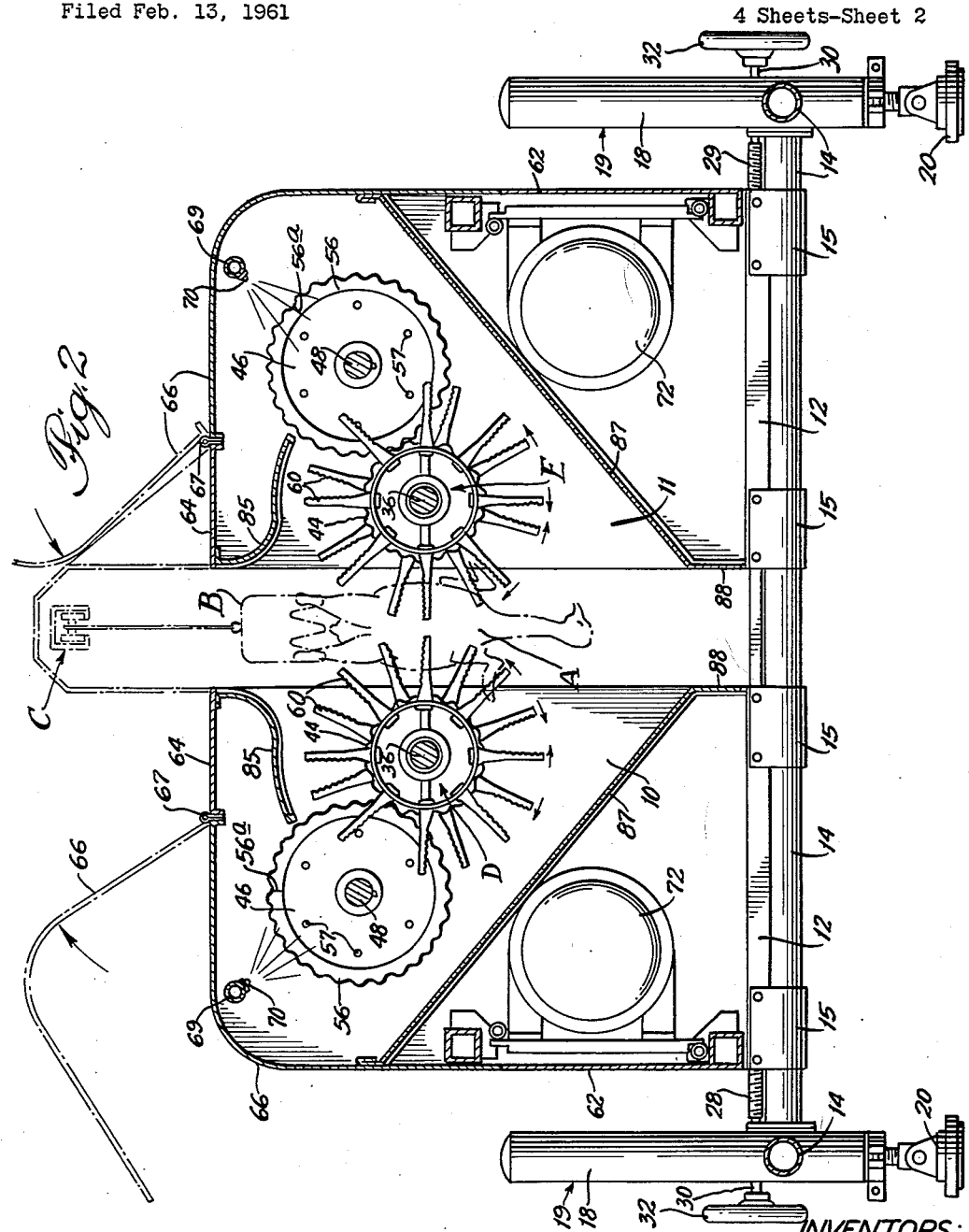
FIGURE 2 is a transverse, vertical sectional view through the machine, taken substantially as indicated at line 2—2 on FIGURE 1.

As may be seen in FIGURES 1 and 2 of the drawings, the machine of the present invention is so designed as to provide two main cooperating units, juxtaposed to provide a passage through which the fowls to be picked may be moved. As seen in dot-and-dash outline in FIGURE 2 of the drawings, the fowls, as indicated at A, are suspended by their legs in shackles B which, in turn, are supported from and are moved by an overhead conveyor, indicated generally at C. By virtue of the overhead conveyor, the fowls are conveyed along a predetermined path of travel through the picking machine. The machine includes a pair of horizontally spaced apart, longitudinally extending picking drum assemblies indicated generally at D and E, which are positioned on opposite sides of the predetermined path of travel of the fowls.

The machine includes two pairs of main, oppositely formed and oppositely disposed end frame panels 10 and 11, with each pair positioned in spaced apart relation at respective ends of the machine. Each end panel is rigidly attached to a downwardly facing channel member 12, which is mounted for sliding movement on a transversely extending tubular main frame member 14, and the channel is confined for longitudinal sliding movement with respect to the members 14 by a plurality of straps 15, as seen in the drawings.

As will hereinafter appear, each aligned set of end panels 10—10 and 11—11 support, respectively, a complete drum assembly and all driving mechanism associated therewith.

The ends of the respective tubular members 14 are rigidly attached to upright cylindrical housing members 18, constituting a part of the pair of hydraulic jacks indicated generally at 19, located at each corner of the machine. The supporting structures for said end frame panels is the same at opposite ends of the machine. Mounted within the jack housings 18 are pistons or cylinders, the lower ends of which are pivotally attached to supporting feet 20. The jacks are actuated hydraulically by a control unit indicated generally at 22, for raising or lowering the adjacent supporting frames and all associated structure. It is to be understood that the respective jacks may be selectively operated so that either or both ends of the machine may be raised or lowered, as may be desired, and none of which constitutes a part of the present invention.

The respective sets of end frames 10—10 and 11—11, carrying a drum assembly and drive mechanism, are movable toward and away from each other, and for this purpose each of the end frame panels is provided, adjacent the bottom thereof, with a tubular projection 26, in which is movably mounted a cylindrical member (not shown) internally threaded and mounted on one of the oppositely threaded portions 28 or 29 of a transversely extending shaft 30, journaled at opposite ends in brackets 31, attached to the housings 18 of the jacks, and the outer ends of the shaft 30 are provided with manually operable hand-wheels 32. A similar set and arrangement of adjusting mechanisms is provided at the other end of the machine. The threaded portions 28 and 29 of the shaft 30 are threaded in opposite directions, so that by rotating the shaft 30 in either direction the pair of end panels 10—11, at one end, carrying the drum assemblies, are caused to be moved toward or away from each other in order to provide a proper spacing of the drum assemblies with respect to each other for performing an efficient picking operation upon the various kinds and sizes of fowls to be processed.

Inasmuch as each of the drum assemblies and associated driving mechanisms therefor are identical but arranged in opposite relation, as seen in FIGURE 3 of the drawings, only one of said assemblies will be described in detail, and the corresponding parts of the other assembly will be accorded identical reference numerals. Each drum assembly includes a longitudinally extending drum shaft 36, journaled at opposite ends in bearings 38, secured to the outside surfaces of the respective main end frame panels. Mounted on the drum shaft is a first set of axially spaced apart drum sets or units 40, preferably formed as metal castings, which are fixedly secured to said shaft by key and set screw arrangement, as indicated at 41 in FIGURE 4 of the drawings; and a second set of axially spaced apart drum sets or units 42, formed as metal castings, are mounted for free rotation on the drum shaft 36, and the drum sets are separated by washers 43. Formed as an integral part of each of the drum sets or units 42, as may be seen in FIGURE 4 of the drawings, is a driven gear member 44, with which cooperates, in intermeshing driving relation, a drive gear member 46, fixedly secured to a longitudinally extending counter shaft 48, located in laterally spaced apart relation to the drum shaft. The drive gear member 46 is rigidly connected to the counter shaft by a key and set screw arrangement as generally indicated at 49. The opposite ends of the counter shaft 48 are journaled in bearings 50, secured to the outer surface of the main end frame panels.

Each drum shaft and counter shaft are separately driven, as will hereinafter be described, and by virtue of which the two drum sets 40 and 42 of each drum assembly are caused to be driven in opposite directions.

The drive gear member 46 comprises a pair of cooperatively and oppositely formed metal disks 54, the outer peripheral edges of which are so formed as to provide an undercut type of groove, as indicated at 55, into which is seated a correspondingly shaped portion of a molded rubber gear ring 56. The two disks 54, with the rubber gear ring 56 mounted in position, are rigidly attached together by cap screws 57. Preferably, the rubber gear ring is formed with a complete split, as indicated at 56a, to facilitate assembly with the disks 54, both initially, and for replacement and maintenance of the machine in operation.

Each of the drum sets 40 and 42 are provided with a multiplicity of radially extending, elongated, flexible feather picking fingers 60, which may be made of rubber or similar material. As may be noted in FIGURE 3 of the drawings, the drum sets 40 and 42 are, in the main, arranged in alternate relation, except at the right hand end of the assembly, as seen in FIGURE 3, where there is provided two drum sets 42 immediately adjacent each other. By virtue of drives, to be hereafter described, it will be seen that the corresponding drum sets 40, on the two drum shaft assemblies, rotate in an upward direction, adjacent the path of travel of the fowls, while the corresponding aligned drum sets 42, on the two drum shaft assemblies, rotate in an opposite, downward direction adjacent the path of travel of the fowls.

The drum assemblies and their drive mechanisms are totally enclosed by a pair of sheet metal end closure panels 61, side walls 62 and top panels 64, secured to the main end frame panels 10 and 11. The balance of the housing or enclosure includes movable, angularly formed sheet metal panel members 66, hingedly connected to top panels 64, at 67 which, in closed position, completes the closure for the remaining top and side portions of the machine. The movable panel members 66 may be swung to an open position, as indicated by dot-and-dash outlines in FIGURE 2, so as to afford convenient access to the drum assemblies, and the separate driving mechanisms for the drum sets for purposes of repair, maintenance, etc. Supported within the housing formed by the enclosures described, are a pair of longitudinally extending water pipes 69, provided with a multiplicity of longitudinally spaced apart nozzles 70, for spraying water in the general direction of the respective drum assemblies and the fowls as they pass through the machine.

Each of the drum shafts 36, and each of the counter shafts 48, are separately driven by electric motors, indicated at 72, positioned within the main housing of the machine, adjacent the respective end frame panels 10 and 11, and preferably include as a part thereof a speed reducing mechanism (not shown). The output shaft 73 of each motor-speed reducing unit extends through the adjacent main end frame panel. Mounted on the outer ends of each of the respective counter shafts 48 is a pulley 75, driven by a belt 76 from a pulley 77 on its corresponding motor shaft 73, as seen in FIGURES 3 and 6 of the drawings, and which serve to rotate the respective drum sets 42 in a manner, as above described, through the medium of the separate drive mechanisms, including gears 44 and 46.

The drum shafts 36 of each of the respective drum assemblies have mounted on the outer ends thereof, as seen in FIGURES 3 and 5 of the drawings, a pulley 80, driven by a belt 81, from a pulley 82 on its corresponding motor shaft 73, and by virtue of which the drum sets 40 on the shaft 36 are rotated as a unit in a manner as above described.

It thus will be apparent that the picking machine as herein disclosed is capable of providing a wide range of variations for accommodating and performing an efficient picking operation upon various kinds and sizes of fowls. The machine is so constructed and arranged as to permit the respective drum assemblies to be moved toward and away from each other, and also moved vertically at either or both ends. The machine is capable of being used in the well known manner of slant-type pickers wherein the axes of the picking drum assemblies are disposed at an angle inclined to horizontal so as to insure the performance of a picking operation upon all portions of the bodies of the fowls during a single passage of the fowls through the machine.

By virtue of the novel separate driving mechanisms for certain of the drum sets or units of each drum assembly, numerous problems and disadvantages inherent in machines of this general type are totally eliminated or greatly improved. It will be noted that the presence of water sprays utilized for wetting of the picking fingers and the fowls also constitute a lubricant for the individual gear drives from the counter shafts 48 to each of the drum sets 42. Furthermore, by virtue of the novel individual drive mechanisms for each of the drum sets 42, the resiliency of the rubber gear ring 56 accommodates, in the bight between said gear ring and the gear 44, wads of feathers that might contact or be collected upon the gear teeth of either of the cooperating gears, and will also accommodate the passage therebetween of the picking fingers 60, that might be deflected laterally so as to pass between the bight of the two gears, without causing any damage to either the drive or the fingers. The resiliency of the gear ring also permits substantial tolerance and accommodation of variations in center to center adjustment between the two gears 44 and 46, without affecting the efficiency of the drives. In prior machines wherein separate V-belt drives have heretofore been employed, wadding of feathers or the deflection of a finger into the drive frequently posed serious problems that necessitated repair and replacement. In such prior drives, because of the presence of water within the machine, the V-belts tend to stretch when wet and tend to shrink when dry, such as when the machine is not being used and, hence, presents continuous problems insofar as concerns providing uniform, efficient and proper drives for certain of the drum sets. Furthermore, V-belt drives as heretofore employed, make it relatively difficult, because of there being large numbers, such as 8 or 9 separate V-belt drives for some of the drum sets of the drum assembly, to obtain uniform tension in the belts for driving such drum sets. When using V-belts, it is necessary to maintain relatively close tolerances insofar as concerns center to center relation between the drive shaft and the shaft being driven. With the present drive arrangement, an adequate range of tolerance is provided, while at all times maintaining the efficiency of the individual drives. Furthermore, if some of the V-belts in machines of the prior constructions were replaced, it would necessitate different adjustments as compared to the remaining belts which frequently have become partially worn. The present construction also eliminates the need for adjusting troublesome idlers in order to attempt to maintain proper tension in the V-belts of the drives. It is also known that the use of V-belts, where they are subject to high moisture conditions, such as in picking machines, wear rather rapidly, whereas in the present construction the rubber-rimmed drive gear possesses relatively long life, aided by the fact that the presence of water serves as a lubricating medium between the rubber drive ring 56 and its cooperating driven metal gear 44.

To aid in confining and directing the feathers removed from the fowls, each of the separate housing structures is provided, adjacent the top, with a curved deflector panel 85, which is connected to the top panel 64, and to the main end panels. There is also provided a pair of panels 87, positioned adjacent and below the drum assemblies, the main portion of which extend upwardly and outwardly, in close relation to the picking drum assembly, and terminates in a depending flange 88. The pair of depending flanges 88, define a passageway through which the feathers removed from the fowls may be discharged downwardly into a suitable drain trough or sump. By reason of the inclination of the panel portions 87, the sprays of water in the machine tend to wash the feathers downwardly for discharging through the passageway for maintaining the machine relatively free of substantial quantities of feathers.

Although we have herein shown and described a certain preferred embodiment of our invention, manifestly it is capable of modification and rearrangement without departing from the spirit and scope thereof. We do not, therefore, wish to be understood as limiting this invention to the precise embodiment herein disclosed, except as we may be so limited by the appended claims.

We claim:

1. A fowl picking machine comprising a pair of horizontally spaced drum shafts, separate drums mounted for free rotation on said shafts, radially extending, flexible picking fingers carried on said drums, a pair of counter shafts positioned adjacent and extending in the same general direction as the respective drum shafts, means for rotating the counter shafts in opposite directions, and separate drive means for said drums, each drive means comprising a pair of intermeshing gears, one fixedly mounted on one counter shaft and the other fixedly connected to the drum on the adjacent drum shaft for causing rotation of the drum, one of said gears having a toothed peripheral portion of metal and the other gear comprising a metal disk and a ring of resilient material secured to the disk and having a toothed peripheral portion.

2. A fowl picking machine comprising a pair of horizontally spaced drum shafts, separate drums mounted for free rotation on said shafts, radially extending, flexible picking fingers carried on said drums, a pair of counter shafts positioned adjacent and extending in the same general direction as the respective drum shafts, means for rotating the counter shafts in opposite directions, and separate drive means for said drums, each drive means comprising a pair of intermeshing gears, one fixedly mounted on one counter shaft and the other fixedly connected to the drum on the adjacent drum shaft for causing rotation of the drum, one of said gears having a toothed peripheral portion of metal and the other gear comprising a pair of disks and a split ring of resilient material secured between said disks and having a toothed peripheral portion.

3. A machine for picking fowls as they are conveyed along a predetermined path of travel, comprising a pair of longitudinally extending, horizontally spaced apart drum shafts, means for rotating said shafts in opposite directions, a first set of axially spaced apart drums fixedly mounted on each drum shaft, a second set of axially spaced apart drums mounted for free rotation on each drum shaft, radially extending, flexible picking fingers carried by each of the drums, a pair of longitudinally extending counter shafts positioned laterally outwardly with respect to said drum shafts, means for rotating said counter shafts in opposite directions, and separate sets of drive means for said second set of drums on each drum shaft, each set of drive means comprising a pair of intermeshing gears, one fixedly mounted on a counter shaft and the other fixedly associated with one of said second sets of drums on the adjacent drum shaft, the gear fixedly associated with a drum on the drum shaft having a toothed peripheral portion of metal and the gear mounted on the counter shaft comprising a metal disk and a ring gear of rubber secured to said disk.

References Cited in the file of this patent

UNITED STATES PATENTS

| 2,469,345 | Toti et al. | May 3, 1949 |
| 2,694,829 | Johnson | Nov. 23, 1954 |
| 2,857,777 | Porter | Oct. 28, 1958 |
| 3,013,440 | White | Dec. 19, 1961 |
| 3,044,108 | De Long | July 17, 1962 |